Aug. 14, 1951  L. C. BOWLING  2,564,147
VALVE

Filed March 9, 1946  2 Sheets-Sheet 1

Leonard C. Bowling
INVENTOR.

BY Jack A. Ashley
Joseph H. Ashley
ATTORNEYS

Aug. 14, 1951

L. C. BOWLING 2,564,147

VALVE

Filed March 9, 1946

2 Sheets-Sheet 2

Leonard C. Bowling
INVENTOR.

BY Jack A. Achley
Joseph H. Achley
ATTORNEYS

Patented Aug. 14, 1951

2,564,147

UNITED STATES PATENT OFFICE 2,564,147

VALVE

Leonard C. Bowling, Houston, Tex.

Application March 9, 1946, Serial No. 653,300

9 Claims. (Cl. 251—101)

1

This invention relates to new and useful improvements in valves.

One object of the invention is to provide an improved valve involving a partially rotatable valve member including an elastic portion arranged to undergo deformation when turned toward a closed position, whereby said portion expands the jacket members into fluid-tight engagement with the inner wall of the valve housing when the valve is shut off.

A further object of the invention is to provide an improved valve having a partially rotatable valve member including a deformable core having external members and arranged so that one or more portions of the core are exposed for packing off the valve housing; together with means for deforming said core to expand the external members into fluid-tight engagement with an inner annular wall of the valve housing, when the valve member is turned.

Another object of the invention is to provide an improved valve having a partially rotatable valve member including a deformable core enclosed within arcuate resilient jackets, terminating short of the ends of the core; together with means for holding the core under sufficient deformation to cause the projecting ends thereof to engage the inner annular wall of the valve housing and pack off the same, also whereby, turning of the valve from an open to a closed position will cause further deformation of the core to expand said jackets into fluid-tight engagement with the housing wall.

Still another object of the invention is to provide an improved valve having a shut-off member including arcuate external members enclosing an elastic body and a telescoping conductor attached to the external members and extending through said body, whereby the body may be deformed and the members expanded without disconnecting the conductor.

A construction designed to carry out the invention will be hereinafter described together with other features of the invention.

Figure 1:
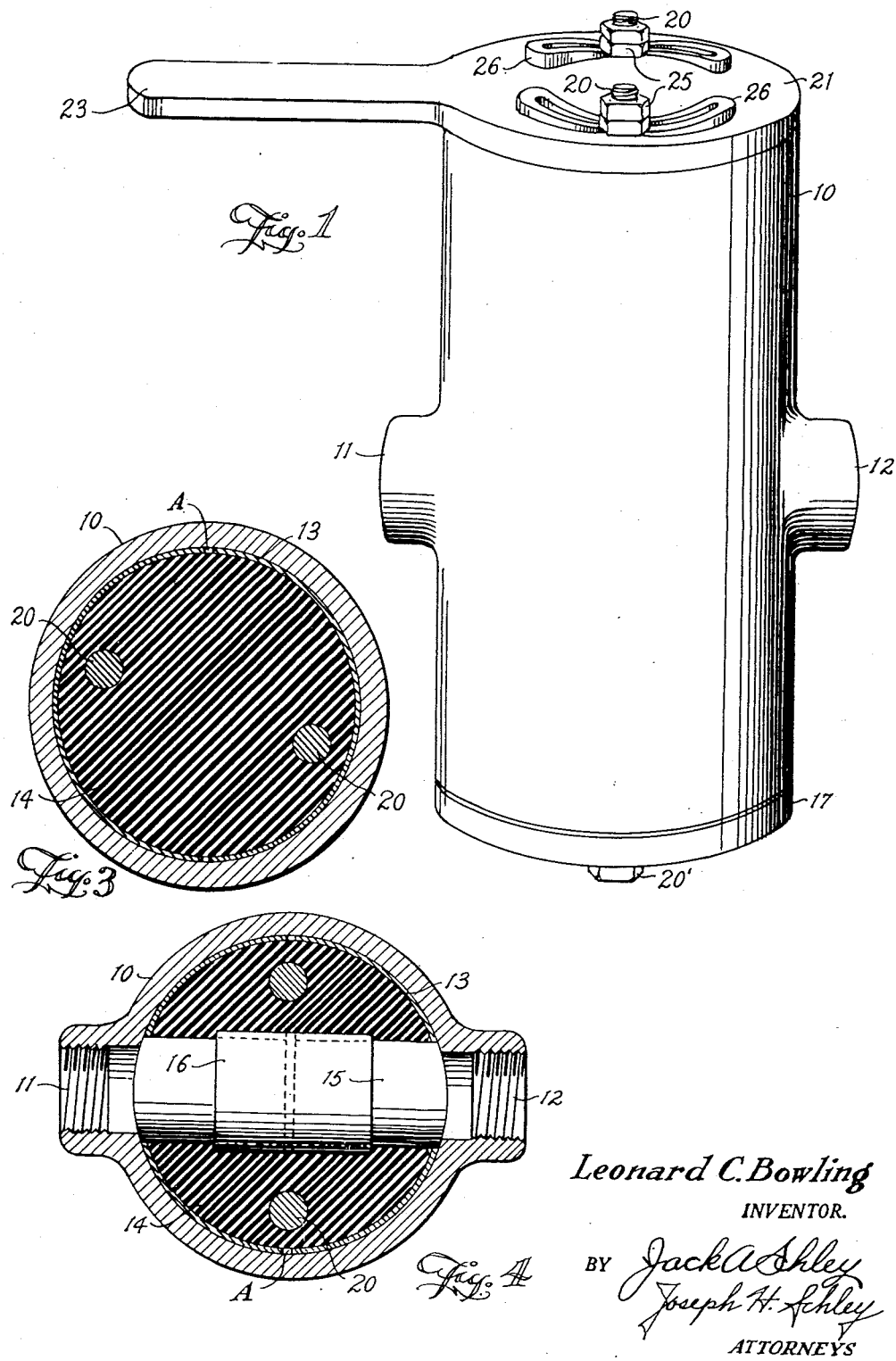
Figure 2:
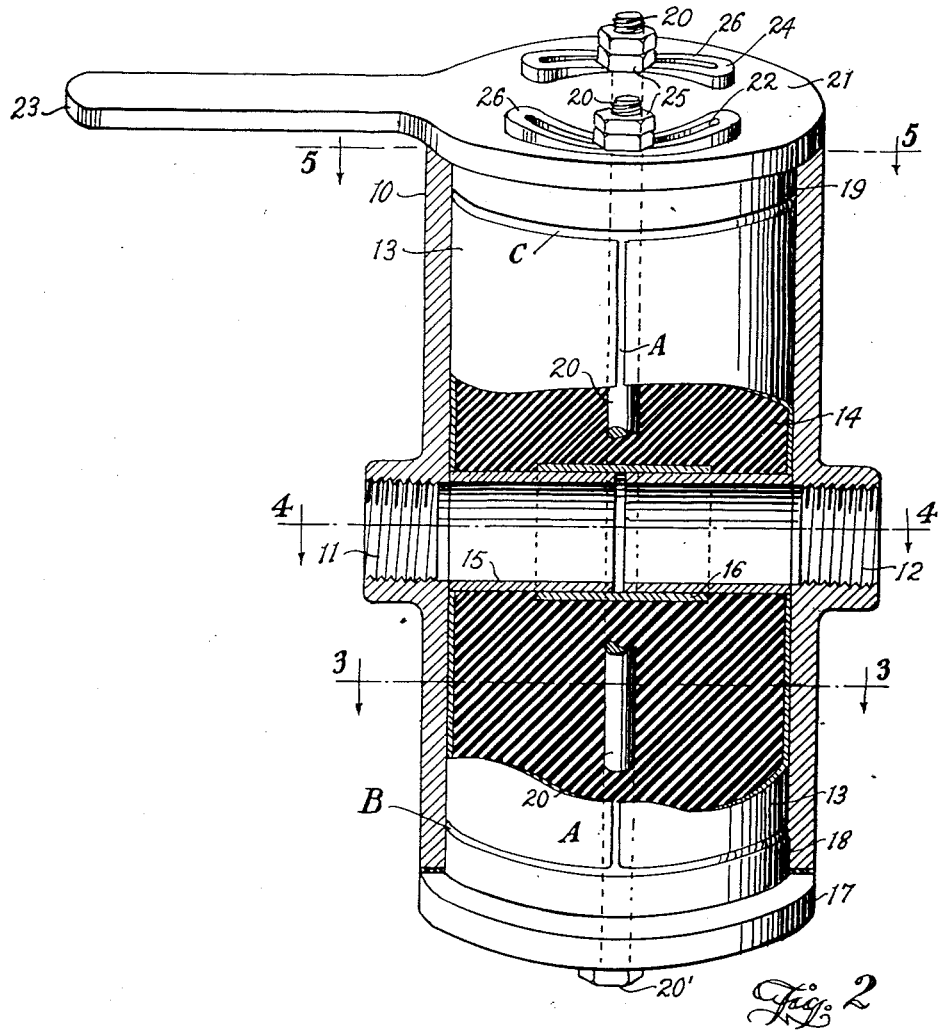

The invention will be more readily understood from a reading of the following specification and by reference to the accompanying drawings, wherein an example of the invention is shown, and wherein:

Fig. 1 is an isometrical view of a valve constructed in accordance with the invention, Fig. 2 is an isometrical view partially in elevation and partially in section, showing the valve in its open position, Fig. 3 is a horizontal cross-sectional view of the

Figure 5:
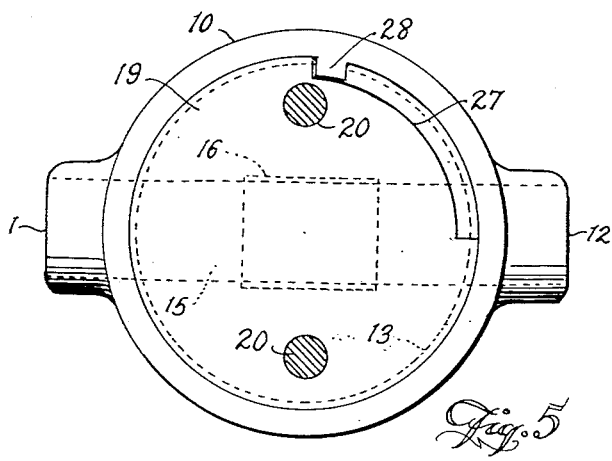

2 valve below its nipples and in its shut-off position,

Fig. 4 is a horizontal cross-sectional view of the valve at its central portion and in its open position, and Fig. 5 is a plan view of the valve, the handle closure being omitted and the connecting rods being shown in section.

In the drawings, the numeral 10 designates a cylindrical valve housing open at each its top and bottom and provided at its mid-height with diametrical opposite nipples 11 and 12, which are internally screw-threaded and project outwardly therefrom. Within the housing a partially rotatable valve member A is mounted. This member is cylindrical and extends through the major portion of the housing. The member includes a cylindrical elastic core 14 enclosed within elongate metallic jackets 13, which are substantially semi-circular in cross-section.

The core may be made of rubber, synthetic rubber or other deformable material, suitable for the purpose. The jackets are preferably made of relatively thin resilient metal and it is desirable to bond them to the core. The vertical edges of the jackets are spaced apart sufficiently to permit said jackets to undergo radial contraction. Flow tubes 15 have their outer ends secured in the medial portions of the jackets and flush with the outer surfaces thereof. The inner ends of these tubes telescope a sleeve 16 and thus form a telescoping conductor adapted to register with the nipples 11 and 12.

A cylindrical plug 17 is provided with a flat cylindrical boss 18 which telescopes the bottom of the housing 10 and contacts the bottom of the valve member A. The parts are so proportioned that when the valve is in its open position, as shown in Fig. 2, the flanged portion of the plug, which extends outwardly from the boss 18, is spaced below the bottom edge of the housing, thereby permitting the plug to undergo a slightly upward movement before engaging with the housing. As the lower end of the core 14 projects below the lower edges of the jackets 13, a narrow annular band B of the core is exposed and this band is extruded sufficiently to engage the inner annular wall of the housing and form a pack-off ring. It is pointed out that even in the open position, the core is sufficiently deformed to produce a snug turning fit between the jackets and the wall of the housing and this will permit the band B to extend under the edges of the jackets and at the same time hold the plug 17 slightly spaced from the bottom edge of the housing.

A flat circular follower disk 19 is inserted in the upper end of the core whereby an annular packing band C similar to the band B is produced. The upper surface of this disk lies substantially flush with the upper annular edge of the housing. Elongate connecting bolts 20 extend upwardly through the plug, core and disk, being disposed transversely to the longitudinal axis of the tubes 15 and sleeve 16 on each side of the latter, as is best shown in Fig. 4. These bolts have heads 20' on their lower ends engaging the under side of the plug 17.

A circular head 21 forming part of an operating member is provided with a radial handle 23. The diameter of the head is substantially the same as the external diameter of the housing 10, and it is adapted to rotate on the upper edge of the housing and upon the upper flat face of the disk 19. The head 21 is formed with arcuate slots 22 radially disposed so as to receive the upper ends of the bolts 20, whereby the head may be rotated with respect to the bolts and the housing. Upstanding arcuate cams 24 are provided on the upper face of the head 21 contiguous to the slots 22 and each cam includes oppositely directed faces 26 inclining upwardly from its central portion. A pair of nuts 25 are screwed onto the upper screw-threaded ends of the bolts 20, the upper nut acting to jam the lower nut in its adjusted positions.

When the valve member A is in its open position, as is shown in Fig. 2, the lower nuts 25 rest at the central or lowest portions of the cams 26. Since the head 21 is mounted to rotate on the upper edge of the housing 10, free of the core 14, jackets 13, disk 19 and bolts 20, it is obvious that there must be some positive connection between said head and the core elements to contribute rotation to the latter when said head is rotated. Further, when the core 14 is retracted or unexpanded, the resilient jackets 13 will be unexpanded and free to rotate in the bore of the housing. The nuts 25 resting in the center of the cams will not ride up said cams upon initial rotation of the head because the frictional resistance offered by said cam is greater than any frictional resistance which might be offered by the jackets 13 and core 14, due to the lack of contact of said jackets with the housing wall. When the handle 23 is first swung, the valve member will be rotated. In order to provide a positive stop to arrest such rotation, the disk 19 is formed with an arcuate recess 27, in its periphery, adapted to receive a lug 28 on the bore of the housing projecting into the recess. These elements will arrest rotation of the valve member A at a full open position and a fully closed position. When the lug engages one end of the recess and rotation of the member is stopped, the nuts will then ride up the cam 26, lift the bolts 20 and expand the core 14 and the jackets 13 into a metal-to-metal contact with the bore of the housing.

It is pointed out that a relatively slight degree of deformation of the core 14 and expansion and contraction of the jackets 13 is involved in the operation of the valve. When the valve is in either its open position or in its shut off position, it is obvious that the initial movement of the handle 23 will break the frictional seal between the jackets and the housing and after this is done, only sufficient clearance is necessary to rotate the valve member A to its full open position. The breaking of the frictional seal is due to the fact that the amplified area of the metal-to-metal contacts between the jackets 13 and the wall of the casing is greater than the frictional resistance of the cams, when the direction of rotation of the head 21 is reversed. While the core and jacket has been illustrated as having a moderate height, it is obvious that the valve could be shortened vertically if desired. The use of the deformable core 14 obviates numerous sliding metal parts commonly used in this type of valve and makes for a very simple, and comparatively inexpensive, structure.

The valve is easy to operate and the conductor formed by the tubes 15 and sleeve 16 shields the core from contact with the fluid passing therethrough. The jackets 13 shield the cylindrical surface of the core from the fluid and provide smooth operating surfaces as well as protecting the core against wear. Due to the fact that the head member of the handle 21 is not positively connected to the valve member A, the plug 17 and the disk 19, said head member is independently movable and thus if the frictional engagement between the jackets 13 and the wall of the housing was of such degree as to resist the initial opening movement, the frictional engagement between the nuts 25 and the faces 26 of the cams would be broken upon initial operation of said head, and this protects the elements enumerated, as well as the bolts 20, against injury. It also provides for a final tightening movement at the end of the shut off operation.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A valve including, a valve housing having a cylindrical bore and provided with an inlet and an outlet, a rotatable closure member at one end of the housing, a rotatable operating member at the opposite end of the housing, a deformable valve member rotatably mounted in the bore of the housing between the closure and operating member having a conductor extending transversely therethrough adapted to register with the inlet and outlet of the housing, said valve member including an elastic core surrounded by an expansible resilient jacket member, the closure and operating members being connected with the valve member, and means for actuating the rotatable operation member to rotate the valve member to move the conductor from the inlet and outlet and to deform the valve member into frictional fluid-tight engagement with the housing to shut off the valve.

2. As a sub-combination in a valve, a cylindrical valve member including, an elastic core, an expansible resilient jacket member surrounding the core, and an expansible conductor extending through the core and attached at its ends to the jacket member.

3. As a sub-combination in a valve, a cylindrical valve member including, an elastic core, an expansible resilient jacket member surrounding the core, and an expansible conductor extending through the core and attached at its ends to the jacket member, the elastic core extending beyond the ends of the jacket member and providing pack-off bands.

4. As a sub-combination in a valve, a valve member including, an elastic core, resilient jackets surrounding said core, tubes secured to the jackets and extending into the core, and a sleeve in the core into which the tubes telescope.

5. A valve including, a valve housing having a cylindrical bore, an elastic core rotatable in the bore of said housing, resilient arcuate jackets surrounding the core adapted to frictionally engage the bore of the housing, the core extending beyond the ends of the jackets and engageable with the bore of the housing to pack-off the same, and means for partially rotating the core and jackets and deforming said core to expand said jackets into engagement with the housing bore.

6. A valve including, a valve housing having a cylindrical bore, an elastic core rotatable in the bore of said housing, resilient arcuate jackets surrounding the core adapted to frictionally engage the bore of the housing, the core extending beyond the ends of the jackets and engageable with the bore of the housing to pack-off the same, means for partially rotating the core and jackets and deforming said core to expand said jackets into engagement with the housing core, and an expansible conductor extending through the core and jackets.

7. A valve including, a valve housing having a cylindrical bore and provided with an inlet and an outlet, a rotatable valve member mounted in the bore having an elastic core and expansible jackets surrounding the core, a rotatable closure member at the bottom of the housing, a conductor extending through the core and adapted to register with the inlet and outlet of the housing, means connected with the closure member and extending through the core for rotating the valve member, and means at the top of the housing connecting with the last named means for actuating the same and for moving such means longitudinally to expand said core when the valve member is moved to a shut off position.

8. A valve including, a valve housing having a cylindrical bore and provided with an inlet and an outlet, a rotatable valve member mounted in the bore having an elastic core and expansible jackets surrounding the core, a rotatable closure member at the bottom of the housing, a conductor extending through the core and adapted to register with the inlet and outlet of the housing, bolts extending from the closure member through the core of the valve member, and rotatable means at the top of the housing co-acting with the bolts for rotating the valve member and deforming the core thereof.

9. A valve including, a valve housing having a cylindrical bore and provided with an inlet and an outlet, a rotatable valve member mounted in the bore having an elastic core and expansible jackets surrounding the core, a rotatable closure member at the bottom of the housing, a conductor extending through the core and adapted to register with the inlet and outlet of the housing, bolts connected with the closure member and extending through the core of the valve member, a rotatable head on the top of the valve housing having cams, and nuts on the bolts riding on the cams for longitudinally displacing the bolts to deform the core and for rotating the valve member when the head is rotated.

LEONARD C. BOWLING.

REFERENCES CITED

The following references are of record in the file of this patent:

UNITED STATES PATENTS

| Number | Name | Date |
| --- | --- | --- |
| 2,274,731 | Parker | Mar. 3, 1942 |
| 2,285,222 | Mueller | June 2, 1942 |
| 2,376,975 | Morgan | May 29, 1945 |

FOREIGN PATENTS

| Number | Country | Date |
| --- | --- | --- |
| 331,216 | France | July 22, 1903 |
| 548,631 | Great Britain | Oct. 19, 1942 |
| 688,382 | France | May 12, 1930 |